United States Patent
Haller (10) Patent No.: US 9,580,115 B2
(45) Date of Patent: Feb. 28, 2017

(54) VEHICLE SEAT OR VEHICLE CAB WITH A SUSPENSION SYSTEM, AND UTILITY VEHICLE

(71) Applicant: GRAMMER AG, Amberg (DE)

(72) Inventor: Erwin Haller, Birgland (DE)

(73) Assignee: Grammer AG, Amberg (DE)

(*) Notice: Subject to any disclaimer, the term of this patent is extended or adjusted under 35 U.S.C. 154(b) by 0 days.

(21) Appl. No.: 14/914,782

(22) PCT Filed: Sep. 24, 2014

(86) PCT No.: PCT/EP2014/070305
§ 371 (c)(1),
(2) Date: Feb. 26, 2016

(87) PCT Pub. No.: WO2015/049131
PCT Pub. Date: Apr. 9, 2015

(65) Prior Publication Data
US 2016/0214658 A1    Jul. 28, 2016

(30) Foreign Application Priority Data
Oct. 1, 2013  (DE) .................. 10 2013 110 926

(51) Int. Cl.
*B60J 7/00*   (2006.01)
*B62D 33/06*  (2006.01)
(Continued)

(52) U.S. Cl.
CPC ......... *B62D 33/0604* (2013.01); *B60G 17/08* (2013.01); *B60G 99/002* (2013.01);
(Continued)

(58) Field of Classification Search
CPC .......... A61L 27/16; A61L 17/04; C08L 23/06; D01F 6/04; A61M 1/30; A61K 9/0004;
(Continued)

(56) References Cited

U.S. PATENT DOCUMENTS 4,729,538 A * 3/1988 Bergacker .............. B60N 2/502
248/550
5,005,894 A * 4/1991 Nagata .................. B60N 2/502
248/421
(Continued)

FOREIGN PATENT DOCUMENTS

DE   10 2004 039973 A1   3/2005
DE      601 16 693 T2    7/2006
(Continued)

OTHER PUBLICATIONS

International Search Report prepared by the European Patent Office on Nov. 27, 2014, for International Application No. PCT/EP2014/070305.
(Continued)

*Primary Examiner* — Kiran B Patel
(74) *Attorney, Agent, or Firm* — Sheridan Ross P.C.

(57) ABSTRACT

The invention relates to a vehicle seat or a vehicle cab with a suspension system comprising an upper closing part and a lower closing part which is deflectable in relation to the upper closing part, which closing parts are connected to each other in a resilient manner by means of a suspension element, and with a damping system for damping vibrations acting on at least one of the two closing parts, wherein the damping system and a distance levelling system for adjusting a distance between the upper closing part and the lower closing part have a common fluid actuator element controlled by compression and tension stages.

11 Claims, 2 Drawing Sheets

(51) Int. Cl.
  *B60N 2/50* (2006.01)
  *B60N 2/52* (2006.01)
  *F16F 9/46* (2006.01)
  *B60G 17/08* (2006.01)
  *B60G 99/00* (2010.01)

(52) U.S. Cl.
  CPC ............. *B60N 2/501* (2013.01); *B60N 2/502* (2013.01); *B60N 2/505* (2013.01); *B60N 2/508* (2013.01); *B60N 2/522* (2013.01); *B60N 2/527* (2013.01); *F16F 9/46* (2013.01); *B60G 2202/24* (2013.01); *B60G 2202/416* (2013.01); *B60G 2500/10* (2013.01); *B60G 2500/11* (2013.01); *B60G 2500/30* (2013.01)

(58) Field of Classification Search
  CPC ........ A61F 2013/530481; A61F 2013/530007; A61F 2013/53035; A61F 2013/53445
  USPC .................................................. 296/190.07
  See application file for complete search history.

(56) References Cited

U.S. PATENT DOCUMENTS

| | | | | |
|---|---|---|---|---|
| 5,222,709 A * | 6/1993 | Culley, Jr. | ............ | B60N 2/502 248/421 |
| 5,390,121 A | 2/1995 | Wolfe | | |
| 5,652,704 A * | 7/1997 | Catanzarite | ............ | B60N 2/501 248/550 |
| 5,975,508 A * | 11/1999 | Beard | ............ | B60N 2/501 180/89.12 |
| 6,109,381 A * | 8/2000 | Stuyvenberg | ...... | B62D 33/0608 180/89.12 |
| 6,120,082 A * | 9/2000 | Vandermolen | ........... | B60N 2/02 248/550 |
| 6,550,740 B1 * | 4/2003 | Burer | ............ | B60N 2/502 248/370 |
| 6,886,650 B2 * | 5/2005 | Bremner | ............ | B60N 2/002 180/89.13 |
| 7,822,522 B2 * | 10/2010 | Wereley | ............ | B60N 2/4242 188/267.1 |
| 7,878,312 B2 * | 2/2011 | Hiemenz | ............ | B60N 2/4242 188/267.2 |
| 7,921,973 B2 * | 4/2011 | Wereley | ............ | B60N 2/4242 188/266 |
| 8,356,858 B2 * | 1/2013 | Jang | ............ | E02F 9/166 296/190.07 |
| 8,585,004 B1 * | 11/2013 | Roeglin | ............ | F16M 11/18 248/421 |
| 9,291,300 B2 * | 3/2016 | Parker | ............ | F16M 13/02 |
| 2004/0112659 A1 | 6/2004 | Kramer et al. | | |
| 2006/0278805 A1 * | 12/2006 | Haller | ............ | B60N 2/502 248/588 |
| 2009/0134595 A1 * | 5/2009 | Haller | ............ | B60G 17/0155 280/124.157 |
| 2009/0179390 A1 * | 7/2009 | Wurmthaler | ........... | B60N 2/501 280/5.519 |
| 2010/0181708 A1 * | 7/2010 | Kolb | ............ | B60G 17/0416 267/113 |
| 2010/0213345 A1 * | 8/2010 | Haller | ............ | B60N 2/501 248/550 |
| 2011/0298266 A1 * | 12/2011 | Haller | ............ | B60N 2/525 297/344.12 |
| 2012/0090930 A1 * | 4/2012 | Haller | ............ | B60N 2/502 188/280 |
| 2012/0187615 A1 * | 7/2012 | Haller | ............ | B60N 2/527 267/140.13 |
| 2013/0264455 A1 * | 10/2013 | Robbins | ............ | F16F 15/022 248/564 |
| 2014/0042776 A1 * | 2/2014 | Leeder | ............ | B62D 33/077 296/190.07 |
| 2014/0251711 A1 * | 9/2014 | Angelo | ............ | B62D 33/063 180/271 |
| 2015/0090549 A1 * | 4/2015 | Haller | ............ | F16F 9/185 188/313 |
| 2015/0232004 A1 * | 8/2015 | Haller | ............ | B60N 2/501 248/562 |
| 2015/0232005 A1 * | 8/2015 | Haller | ............ | B60N 2/505 248/562 |
| 2016/0001685 A1 * | 1/2016 | Ulrich | ............ | B60N 2/502 248/550 |
| 2016/0207430 A1 * | 7/2016 | Haller | ............ | B60N 2/501 |
| 2016/0230830 A1 * | 8/2016 | Haller | ............ | B60N 2/505 |
| 2016/0311446 A1 * | 10/2016 | Haller | ............ | B60N 2/505 |

FOREIGN PATENT DOCUMENTS

| | | |
|---|---|---|
| DE | 20 2011 005 606 U1 | 11/2011 |
| DE | 10 2011 100307 A1 | 11/2012 |
| EP | 1 188 608 A1 | 3/2002 |

OTHER PUBLICATIONS

German Search Report prepared on Jul. 23, 2014, for German Application No. 10 2013 110 926.8.

* cited by examiner

VEHICLE SEAT OR VEHICLE CAB WITH A SUSPENSION SYSTEM, AND UTILITY VEHICLE

CROSS REFERENCE TO RELATED APPLICATIONS

This application is a national stage application under 35 U.S.C. 371 and claims the benefit of PCT Application No. PCT/EP2014/070305 having an international filing date of 24 Sep. 2014, which designated the United States, which PCT application claimed the benefit of German Patent Application No. 10 2013 110 926.8 filed 1 Oct. 2013, the disclosures of each of which are incorporated herein by reference in their entirety.

FIELD

The invention relates to a vehicle seat or a vehicle cab, having a suspension device comprising an upper end part and a lower end part that is deflectable relative to the upper end part, which parts are resiliently interconnected by means of a suspension element, and comprising a damping device for damping vibrations acting between the end parts.

Furthermore, the invention relates to a utility motor vehicle comprising a vehicle seat and comprising a vehicle cab.

BACKGROUND

Generic vehicle seats or vehicle cabs by means of which the ride comfort in particular of utility motor vehicles can be considerably improved are well known from the prior art.

SUMMARY

The object of the present invention is to support generic vehicle seats or vehicle cabs respectively in a structurally simpler manner relative to a vehicle body while providing improved seating comfort and ride comfort respectively.

The object of the invention is solved by a vehicle seat or a vehicle cab having the features indicated in claim 1.

The invention expands on the generic prior art in that the damping device and a distance-adjusting device for adjusting a distance between the upper end part and the lower end part comprise a common actuator fluid element controlled by pressure stages and tension stages, as a result of which a suspension system can be provided which is constructed in a correspondingly simple manner.

Advantageously, at least parts of the damping device and the distance-adjusting device are implemented in a structurally simple manner by means of the common actuator fluid element controlled by pressure stages and tension stages, and therefore these devices can be constructed using much fewer components in conjunction with a fluid-conveying system.

Within the meaning of the invention, the present distance-adjusting device is a height-adjusting device that operates in the vertical direction, and therefore the upper end part can be moved relative to the lower end part in a vertical deflection direction by means of the common actuator fluid element controlled by pressure stages and tension stages.

According to the invention, the actuator fluid element controlled by pressure stages and tension stages is arranged between the two end parts such that it can act on the upper of the two end parts in the vertical direction of the vehicle in both a vibration-isolating manner and a height-regulating manner.

As a result, a hydraulically acting damping and height-adjusting unit for a suspension system, in terms of a damping device together with height adjustment, and thus the entire substructure of the vehicle seat or the vehicle cab respectively can be implemented in an extremely structurally simple manner, in order to bring about corresponding vibration isolation and/or height adjustment exclusively or in an auxiliary manner.

Therefore, adjustment forces acting in the vertical direction of the vehicle can be generated in a structurally simple manner, as is explained in the following in greater detail, still by way of example.

In addition, this hydraulically acting damping and height-adjusting unit or the common actuator fluid element controlled by pressure stages and tension stages respectively can produce a linearly rising force characteristic curve or spring characteristic curve respectively over the entirety of the available suspension travel.

At this point, it is noted that the common actuator fluid element controlled by pressure stages and tension stages and the hydraulically acting damping and height-adjusting unit respectively can be constructed in a structurally very simple manner if the actuator fluid element comprises a hydraulic shock absorber element.

The object of the invention is furthermore solved by a utility motor vehicle having the features indicated in claim 11.

The vehicle seat according to the invention or the vehicle cab according to the invention respectively can be advantageously used in particular in conjunction with utility motor vehicles, since the vehicle driver is better protected against premature fatigue owing to the considerably improved seating comfort and ride comfort respectively. Furthermore, in terms of utility motor vehicles, there is also great interest in solutions for corresponding suspension systems that are structurally simple and thus less susceptible to faults. This also applies in particular with regard to agricultural utility motor vehicles.

The suspension system which is provided in the vehicle seat or the vehicle cab respectively therefore comprises the suspension device and the damping device, and in the present case a height-adjusting device is also implied.

The suspension device may comprise one or more suspension elements, which may for example be designed as a mechanical suspension element and/or preferably as a pneumatic suspension element.

The upper end part of the suspension device may for example be attached to the underside of a seat part of the vehicle seat or to the underside of the vehicle cab, or may be formed directly from this respective underside.

In this respect, the lower end part of the suspension device may for example be fastened to a component of a vehicle body or may be formed directly by said body.

In any case, the upper end part is mounted on a substructure of the vehicle seat or the vehicle cab respectively relative to the lower end part such that said upper end part can be deflected relative to the lower end part in the vertical deflection direction, i.e. in the vertical direction of a vehicle, in particular a utility motor vehicle, in particular if external vibrations are acting on the vehicle seat or vehicle cab respectively.

In this respect, the upper end part is a component of the suspension device that vibrates substantially vertically, the main vibration direction of which is oriented in the vertical direction of the vehicle, i.e. is vertical.

For this purpose, the suspension device is in particular equipped with a vertical suspension element which can act in the vertical direction of the vehicle in a resilient manner.

A deflection mechanism for deflecting the upper end part relative to the lower end part can be achieved very simply for example by means of a scissors type frame. However, it does not necessarily have to comprise a scissors type frame of this type.

In structural terms, it is however advantageous for the upper end part and the lower end part to be operatively interconnected by means of a scissors type frame. As a result, the upper end part is also guided in the vertical direction in a defined manner.

A preferred variant of the embodiment provides that the actuator fluid element is operatively connected to a controllable fluid-conveying device, which is in fluid connection with both the pressure-stage chamber and the tension-stage chamber of the actuator fluid element such that various height adjustments of the upper end part can be carried out by controlling the power of the controllable fluid-conveying device.

As a result of this fluid connection, the upper end part can be actively raised or lowered relative to the lower end part by the fluid-conveying device or by a fluid-conveying flow generated thereby respectively, in particular depending on in which conveying direction the fluid-conveying device conveys the fluid. As a result, the fluid-conveying system can be advantageously further developed.

In this respect, it is also particularly advantageous for the fluid-conveying device to be reversible in terms of its conveying direction.

Alternatively, two fluid-conveying devices having opposite conveying directions could also be integrated into a correspondingly designed fluid-conveying system.

In particular in this context, it is advantageous for the actuator fluid element to be operatively connected to a controllable fluid-conveying device which is in fluid connection with both the pressure-stage chamber and the tension-stage chamber of the actuator fluid element such that the fluid can be conveyed out of either the pressure-stage chamber or the tension-stage chamber of the actuator fluid element depending on the conveying direction of the fluid-conveying device and/or out of another fluid reservoir of the fluid-conveying system into either the pressure-stage chamber or the tension-stage chamber. As a result, the upper end part can be actively moved, in particular raised or lowered, relative to the lower end part very precisely in two opposite directions.

A particularly preferred variant of the embodiment provides that the actuator fluid element is operatively connected to a flow-control valve element, which is in fluid connection with the actuator fluid element and a controllable fluid-conveying device such that the power of the pressure stage or the tension stage can be additionally modulated by means of this flow-control valve element. As a result of this too, the fluid-conveying system can again be simplified in terms of structure.

Here, the flow-control valve element is a device for modulating damper performance at both the pressure stage and the tension stage of the actuator fluid element.

Preferably, the flow-control valve element is implemented as an electrically operable throttle valve in the form of a proportional flow control valve, since the flow-control valve element can be actuated very rapidly by this means, as a result of which corresponding pressure changes in the pressure-stage or tension-stage chamber respectively of the flow-control valve element can in turn be achieved very rapidly. It is clear that as an alternative, flow-control valve elements that are operable in different ways may also be used.

If the flow-control valve element is in fluid connection with the actuator fluid element and the controllable fluid-conveying device such that the power of the pressure stage and the tension stage can be additionally modulated by means of this flow-control valve element while not affecting the power of the fluid-conveying device, the response behaviour of the actuator fluid element can be improved further.

In the present case, vibrations can be very effectively isolated if the flow-control valve element is in fluid connection with the actuator fluid element and the controllable fluid-conveying device such that vibrations of one of the end parts can be isolated by means of the flow-control valve element.

If a low-pressure connection of the fluid-conveying device is in fluid connection with the tension-stage chamber by means of a low-pressure line and a high-pressure connection of the fluid-conveying device is in fluid connection with the tension-stage chamber by means of a high-pressure line, or vice versa, the low-pressure line and the high-pressure line being fluidically interconnected by means of an electrically operable proportional flow control valve, as well as an active height adjustment, vibration isolation can also be carried out in a manner which is particularly simple structurally and in terms of process.

In this case, the low-pressure side and high-pressure side switch depending on the conveying direction of the fluid-conveying device.

Here, the type and intensity of the control of the common actuator fluid element controlled by pressure stages and tension stages can be influenced by means of a control algorithm of a corresponding open-loop and/or closed-loop control device.

In this respect, it is advantageous for there to be an open-loop and/or closed-loop control device for adjusting a fluid-conveying device and/or a flow-control valve element depending on a load acting on the upper end part.

Specifically, adjusting the fluid-conveying device and/or the flow-control valve element depending on the type and intensity of the external forces acting on the actuator fluid element makes it possible to significantly increase the seating comfort.

The common actuator fluid element controlled by pressure stages and tension stages may operate particularly efficiently if the open-loop and/or closed-loop control device comprises an acceleration-measuring sensor which is arranged on the face of the lower end part and is intended for detecting accelerations acting on the lower end part.

Yet more precise open-loop or closed-loop control of the common actuator fluid element controlled by pressure stages and tension stages can be achieved if the open-loop and/or closed-loop control device comprises a position-measuring sensor for detecting a distance and/or a distance variation between the upper and the lower end part.

The present invention provides an actively controlled suspension system using very simple means, which suspension system additionally has the common actuator fluid element controlled by pressure stages and tension stages, which can temporarily adjust a set height level, in particular a set height of a vehicle seat. On the other hand, it can also be actively involved in isolating vibrations. In this respect, this means that the hydraulic damping and height-adjusting unit is also produced to be particularly simple in structure.

Here, a conventional air suspension element or the like may be used as basic suspension, while the common actuator fluid element controlled by pressure stages and tension stages can act in the vertical suspension direction in an auxiliary manner as an additional active component or additional active assembly.

The controllable fluid-conveying device is preferably in the form of a high-pressure pump which is driven by an electric motor and has a variable rotational speed and ideally a rotational direction reversal. It has, for example, a defined fluid discharge rate in cm$^3$/revolution, which introduces a specific conveyed fluid quantity produced thereby into the pressure-stage chamber or pressure-stage side respectively or into the tension-stage chamber or tension-stage side of the actuator fluid element at a corresponding rotational speed respectively, as a result of which an extension force (pressure-stage side) or retraction force (tension-stage side) acting on the upper end part is generated in accordance with the flow resistance inherent in the pressure-stage side or tension-stage side respectively.

When stopped, i.e. 0.0 l conveying capacity of the controllable fluid-conveying device, the actuator fluid element acts as a passive shock absorber, which in its basic design contains characteristic data for the tension-stage and pressure-stage power, as is also used in passive, commercially available vehicle seats.

When the controllable conveying device is activated, in accordance with its rotational speed and its conveying direction, a defined conveyed quantity is transferred from the tension-stage side to the pressure-stage side, or vice versa, by pumping. The flow resistance produced depending on conveyed quantity at the valve holes in the pressure stage brings about an extension force or vertically acting supporting force respectively on the piston-rod side of the actuator fluid element. This means that the upper end part of the suspension device to which a load is applied is raised by a value resulting therefrom. The flow resistance produced depending on conveyed quantity at the tension stage brings about an retraction force on the opposite piston-rod side, as a result of which the upper end part can be lowered quickly relative to the lower end part or brought closer to the lower end part respectively.

This active force or extension or retraction force respectively is used on the one hand for height adjustment and on the other hand as a control variable for influencing the vibration isolation and also to increase or decrease the damper performance of the actuator fluid element.

As an additional feature, in the present case the flow-control valve element is provided, which additionally influences the isolation of the introduction of vibrations. Here, the damper performance of the actuator fluid element, which is defined as hard in the passive state, is set to be softer. This means that the flow resistance between the pressure stage and tension stage of the actuator fluid element is reduced by means of the flow-control valve element.

Further advantages, aims and properties of the present invention are explained with reference to the drawings and the following description, in which a vehicle seat substructure of a utility motor vehicle seat comprising a common actuator fluid element, controlled by tension stages and pressure stages, of a damping device and of a distance-adjusting device is shown and described by way of example. In the drawings:

DETAILED DESCRIPTION

Figure 1:
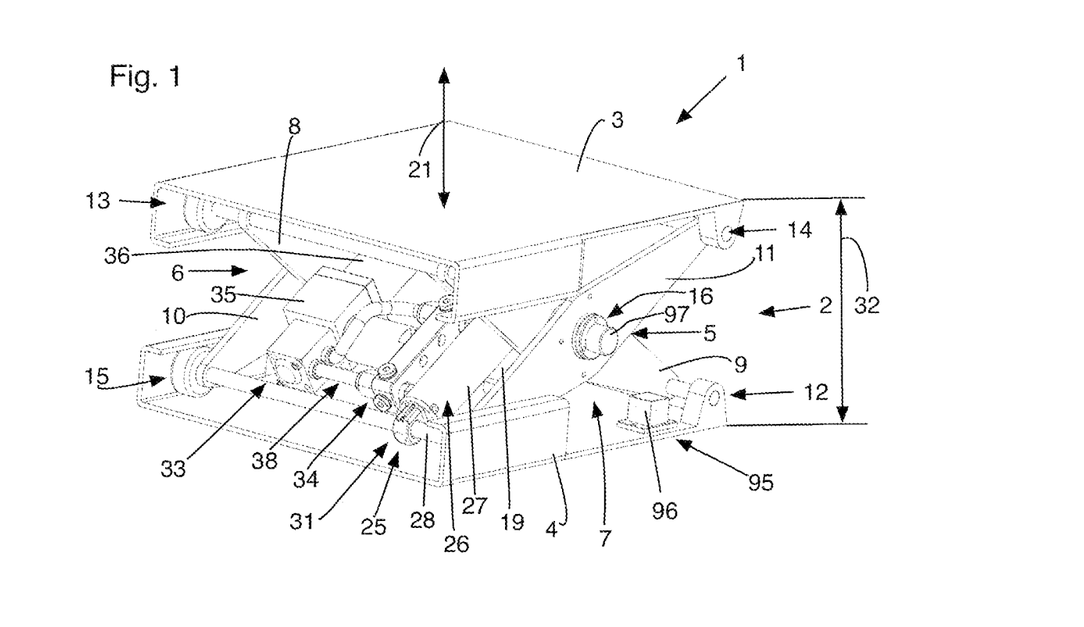
FIG. 1 is a schematic perspective view of vehicle seat substructure comprising a common actuator fluid element, controlled by tension stages and pressure stages, of a damping device and of a distance-adjusting device, the actuator fluid element being arranged between two end parts of a suspension device such that it acts on one of the two end parts in the vertical direction of the vehicle in both a vibration-isolating manner and a height-adjusting manner, FIG. 2 schematically shows a first fluid circuit diagram of a first possible fluid-conveying system of the actuator fluid element from FIG. 1.

The vehicle seat substructure 1, shown in FIG. 1, of a vehicle seat (not shown here in greater detail) comprises a suspension device 2, which is characterized by an upper end part 3 and a lower end part 4 which, in this embodiment, are both coupled to one another by a scissors type frame 5 in a height-adjustable manner.

The scissors type frame 5 substantially consists of two pairs of scissor arms 6 and 7, which in turn each comprise a first scissor arm 8 and 9 respectively and a second scissor arm 10 and 11.

The first scissor arms 8 and 9 respectively are on the one hand rotationally mounted on the lower end part 4 by means of a common lower fixed-bearing device 12. On the other hand, they are mounted on the upper end part 3 in a linearly movable manner by means of a common upper movable-bearing device 13.

The second scissor arms 10 and 11 behave similarly, and are rotationally mounted on the upper end part 3 by means of a common upper fixed-bearing device 14 and are mounted on the lower end part 4 in a linearly movable manner by means of a common lower movable-bearing device 15.

The first and second scissor arms 8, 10 and 9, 11 respectively of the respective pairs of scissor arms 6 and 7 respectively are rotationally interconnected by means of pivotal points 16 (only explicitly provided with a reference numeral at this point).

Furthermore, the suspension device 2 also comprises a suspension element 19, by means of which the two end parts 3 and 4 are resiliently interconnected. In this embodiment, the suspension element 19 is provided by a pneumatic-spring element.

When installed, the upper end part 3 is integrated in the vehicle seat on the seat-part side and the lower end part 4 is integrated in the vehicle seat on the vehicle-body side such that the upper end part 3 can rebound and deflect respectively relative to the lower end part 4 in the vertical direction 21 of the vehicle, i.e. vertically, when a corresponding external stimulus acts on the vehicle seat or on the vehicle respectively.

In order for it to be possible to at least partially isolate the vibrations of the upper end part 3, the vehicle seat substructure 1 further comprises a damping device 25 comprising a hydraulic shock absorber element 26.

The hydraulic shock absorber element 26 is attached by its cylinder part 27 to a cross bar 28 of the common lower movable-bearing device 15 and by a piston part 29 (see FIG. 2) to the first scissor arm 9 of the second pair of scissor arms 7.

In this embodiment, the hydraulic shock absorber element 26 forms the basis for the claimed actuator fluid element 31 controlled by pressure stages 30 and tension stages 30A, by means of which element active vibration isolation can additionally be achieved, and furthermore height adjustment of the upper end part 3 relative to the lower end part 4 can also be achieved.

For this purpose, the actuator fluid element 31 controlled by pressure stages 30 and tension stages 30A is arranged between the two end parts 3, 4 such that it can act on the upper end part 3 in the vertical direction 21 of the vehicle in an actively vibration-isolating manner and also in a height-adjusting manner.

In this respect, the vehicle seat substructure 1 not only comprises a simple damping device 25 but also a distance-adjusting device (not specifically provided with a reference numeral here) for adjusting the distance 32 between the upper end part 3 and the lower end part 4, the damping device 25 and the distance-adjusting device together comprising the actuator fluid element 31 controlled by pressure stages 30 and tension stages 30A. This means that the vehicle seat substructure 1 is extremely compact, despite its functionality being considerably enhanced.

Furthermore, a controllable fluid-conveying device 33 for conveying a fluid, this being a hydraulic fluid 46 as in the present embodiment, and a flow-control valve element 34 are also provided in the vehicle seat substructure 1.

The fluid-conveying device 33 consists of a hydraulic pump 35, which is continuously driven by an electric motor 36, the fluid-conveying device 33 having two opposite conveying directions 59 and 59A (see drawings, 59, 59A), as will be explained in more detail below.

In this case, the flow-control valve element 34 is designed as an electrically operable throttle valve in the form of a proportional flow control valve 37.

The controllable fluid-conveying device 33, the flow-control valve element 34 and the actuator fluid element 31 controlled by pressure stages 30 and tension stages 30A respectively are fluidically interconnected by means of a corresponding fluid pipeline system 38 (only provided with a reference numeral in FIG. 1 by way of example).

Figure 2:
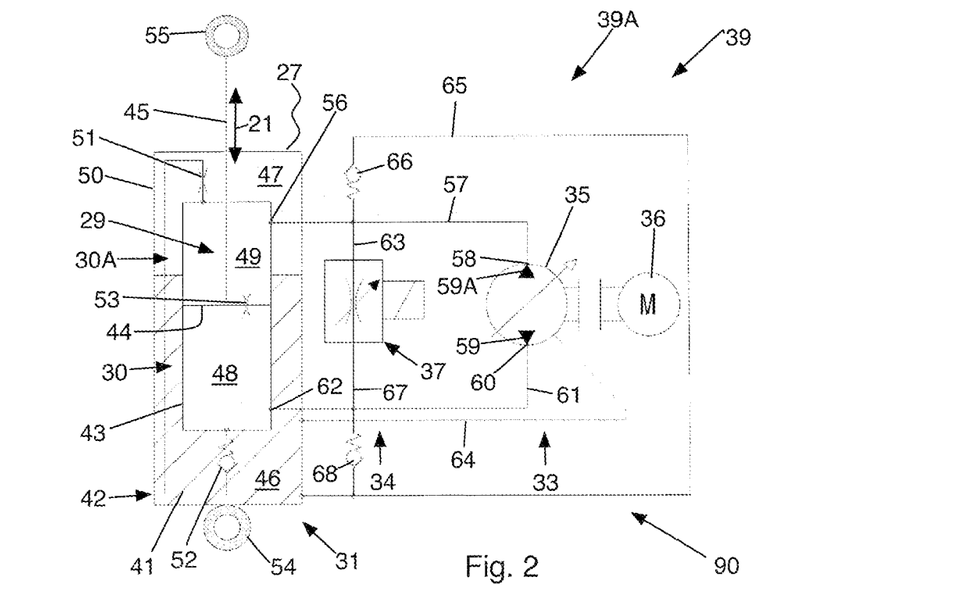

In the arrangement of the first fluid-conveying system 39 shown in FIG. 2 according to the first flow diagram 39A, the actuator fluid element 31 controlled by pressure stages 30 and tension stages 30A is arranged on the left. To the right thereof, there is the flow-control valve element 34, and the controllable fluid-conveying device 33 is arranged further to the right and has two opposite conveying directions 59 and 59A respectively.

The actuator fluid element 31 controlled by pressure stages 30 has an external housing 42 which forms a hydraulic-fluid tank 41 and also defines the actual working cylinder 43 in which the piston part 29 consisting of the piston head 44 and the piston rod 45 moves.

Some of the hydraulic fluid 46 is stored in the hydraulic-fluid tank 41. Furthermore, the hydraulic-fluid tank 41 also provides a gas-volume compensation space 47.

The working cylinder 43 comprises a pressure-stage chamber 48, by means of which the pressure stage 30 of the actuator fluid element 31 is implemented. The corresponding tension stage 30A is produced inter alia by means of a tension-stage chamber 49 of the working cylinder 43.

Furthermore, the actuator fluid element 31 also comprises a rising pipe 50 comprising a pressure-compensation valve 51 for pressure compensation within the tension-stage chamber 49, in particular when the pressure stage 30 is activated, it then being possible for hydraulic fluid 46 to flow out of the hydraulic-fluid tank 41 into the tension-stage chamber 49 through this rising pipe 50.

For pressure compensation in the pressure-stage chamber 48 when the tension stage 30A is activated, a foot valve 52 is provided through which hydraulic fluid 46 can flow out of the hydraulic-fluid tank 41 into the pressure-stage chamber 48, but not in the other direction.

A pressure-stage/tension-stage valve 53 of the actuator fluid element 31 is also integrated in the piston head 44, by means of which valve a basic tension stage/pressure stage is inherent in the actuator fluid element 31 as a passively acting hydraulic shock absorber element.

As already mentioned above, the actuator fluid element 31 is connected, by its cylinder part 27, to the cross bar 28 and thus also to the lower end part 4 by means of a lower connecting point 53, while said element is connected, by its piston part 29, to the first scissor arm 9 of the second pair of scissor arms 7 and thus also to the upper end part 3 by means of an upper connecting point 54.

The actuator fluid element 31 comprises, at its tension-stage chamber 49, a tension-stage chamber connection 56, with which a first fluid pipeline 57 is in fluid connection. This first fluid pipeline 57 represents a fluid connection between the tension-stage chamber 49 and a first connection 58 of the hydraulic pump 35, and therefore the hydraulic fluid 46 can be conveyed out of the tension-stage chamber 49 by means of the controllable fluid-conveying device 33 in the conveying direction 59 of the hydraulic pump 35. In this case, the first fluid pipeline 57 is a low-pressure line and the first connection 58 is a low-pressure connection.

A further fluid pipeline 61 leads from a further connection 60 of the hydraulic pump 35 to a pressure-stage chamber connection 62, and therefore the hydraulic fluid 46 conveyed out of the tension-stage chamber 49 can be further conveyed into the pressure-stage chamber 48, as a result of which the piston part 29 is accordingly pushed out of the cylinder part 27. As a result, the upper end part 3 is raised in the vertical direction 21 of the vehicle and is thus moved further away from the lower end part 4. In this case, the further fluid pipeline 61 is a high-pressure line and the further connection 60 is a high-pressure connection.

It is precisely the reverse case if the hydraulic fluid 46 is conveyed in the conveying direction 59A, which is opposite the first conveying direction 59. In this further case, the first fluid pipeline 57 becomes a high-pressure line and the further fluid pipeline 61 becomes a low-pressure line.

A connecting line 63 is also connected between the first fluid pipeline 57 and the further fluid pipeline 61, by means of which connecting line the flow-control valve element 34 is in fluid connection between the actuator fluid element 31 and the controllable fluid-conveying device 33. More precisely, the flow-control valve element 34 is connected in parallel with the controllable fluid-conveying device 33 with respect to the actuator fluid element 31. Therefore, the flow resistance at the actuator fluid element 31 can be changed by means of the flow-control valve element 34, independently of the conveying direction 59 or 59A respectively of the fluid-conveying device 33, as a result of which an influence on the vibration-isolating capacity of the actuator fluid element 31 can be achieved.

An overflow fluid line 64 is also provided between the hydraulic pump 35 and the hydraulic-fluid tank 41.

A feed line 65 comprising a non-return valve 66 is also arranged between the first fluid pipeline 57 and the hydraulic-fluid tank 41; likewise, a further feed line 67 comprising a further non-return valve 68 is provided between the further fluid pipeline 61 and the hydraulic tank 41. As a result, if necessary, hydraulic fluid 46 can be directly conveyed out of the hydraulic-fluid tank 41 into the pressure-stage chamber 48 or into the tension-stage chamber 49 by means of the hydraulic pump 35.

Figure 3:
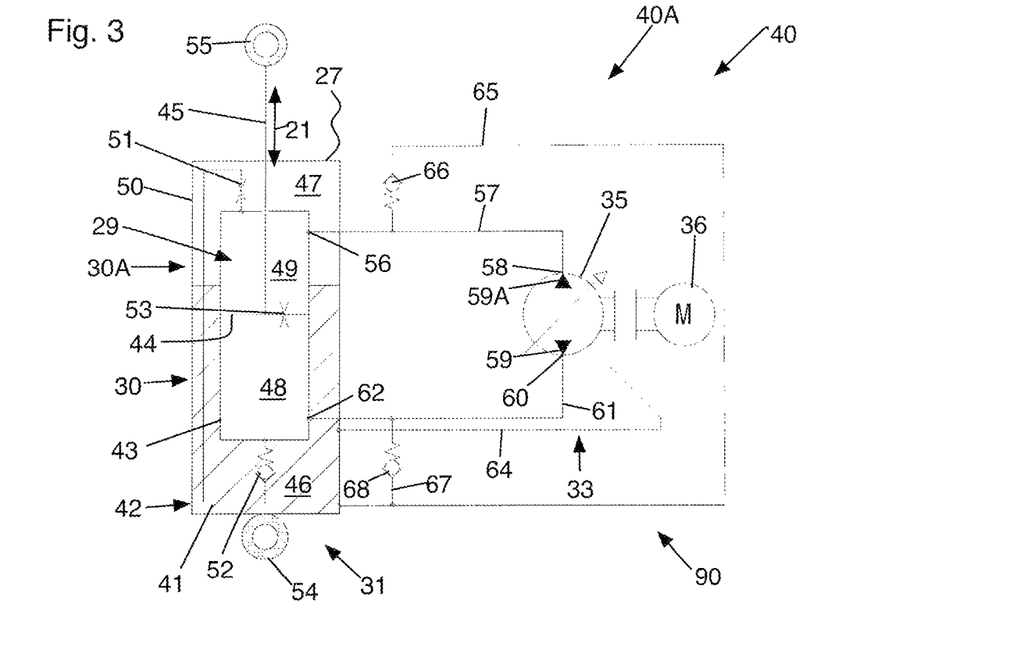
FIG. 3 schematically shows a further fluid circuit diagram of a further possible fluid-conveying system of the actuator fluid element from FIG. 1, and FIG. 4 schematically shows a graph having different spring characteristic curves of the suspension device from FIG. 1.

In the further arrangement of the first fluid-conveying system 40 shown in FIG. 3 according to the first flow diagram 40A, the flow-control valve element 34 is missing (see in particular FIG. 2). Otherwise, the set-up of the arrangement from FIG. 2 is identical to the set-up of the further arrangement shown in FIG. 3. In this respect, the further arrangement is not explained again, in order to avoid repetitions. The function of the flow-control valve element 34 (not present) is achieved at least in part by way of the reversal of the conveying direction 59 or 59A respectively.

The arrangements shown in the flow diagrams 39A and 40A each represent a first advantageous damping and height-adjusting unit 90 of the invention. In this respect, this hydraulically acting damping and height-adjusting unit 90 can not only be considered to be an additional functional assembly of the damping device 25, but at the same time is also the height-adjusting and distance-adjusting device respectively (not explicitly provided with a reference numeral here) for adjusting the distance 32 with respect to the upper end part 3 and the lower end part 4 in the vertical direction 21 of the vehicle.

Figure 4:
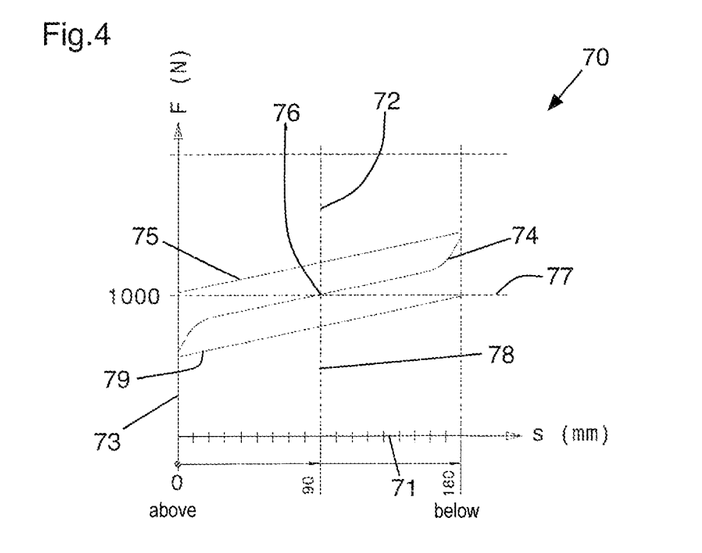

It is also advantageous for linearly rising force characteristic curves 75 and 79 to be provided over the entirety of the available suspension travel s, as is also shown by the graph 70 shown in FIG. 4.

In the graph 70, the existing suspension travel s is plotted in millimeters on the abscissa 71, a desired average vertical height level 72 being at 90 mm, so that the upper end part 3 can ideally cover both a vertically downwardly available negative suspension travel and a vertically upwardly available positive suspension travel of 90 mm in each case.

The force F counteracting a load on the upper end part 3 is plotted on the ordinate 73 of the graph 70 in Newtons.

The central spring characteristic curve 74 plotted on this graph 70 is that of the suspension element 19 which extends through the point of intersection 76 of the line 77 produced by the load of 1000 N and the further line 78 produced by the vertical height level 72 and which progresses logarithmically at the start of the suspension travel s and exponentially at the end of the suspension travel s; in between, the central spring characteristic curve 74 of the suspension element 19 rises linearly.

The force characteristic curve 75 extending above the central spring characteristic curve 74 contains the effect of activating the pressure stage 30 of the actuator fluid element 31 controlled by pressure stages 30 and tension stages 30A, this upper force characteristic curve 75 extending completely linearly over the entirety of the suspension travel s.

The upper force characteristic curve 75 therefore shows the upper target values for the forces generated by the damping and height-adjusting unit 90 in the vertical direction 21 of the vehicle.

The lower force characteristic curve 79 extending below the central spring characteristic curve 74 describes the forces generated by the damping and height-adjusting unit 90 in the vertical direction 21 of the vehicle with respect to lower target values. The lower force characteristic curve 79 contains the effect of activating the tension stage 30A of the actuator fluid element 31 controlled by pressure stages 30 and tension stages 30A, this lower force characteristic curve 79 also extending completely linearly over the entirety of the suspension travel s.

It can be clearly seen from the graph 70 that in particular the suspension element 19 serves as a basis for receiving a basic load which acts on the suspension as a mass. The maximum possible spring force is in particular specified by the dimension of the damping and height-adjusting unit 90, which is 200 N in the vertical direction 21 of the vehicle in the graph 70 shown. In the event of temporary level variations which may occur for example by the drivers weight shifting when driving uphill, downhill or at an angle, depending on the direction and intensity of the variation, the forces generated by the damping and height-adjusting unit 90 can be increased or decreased. In the present damping and height-adjusting unit 90, the forces generated thereby are actively utilised to influence external introductions of force that are fed into the suspension system. The damping and height-adjusting unit 90 may on the one hand work with the introduction of force, i.e. a retraction force is caused or a supporting force respectively for carrying the mass is reduced, as a result of which the upper end part 3 is actively lowered relative to the lower end part 4. On the other hand it may also work against the introduction of force, the supporting force being accordingly increased, as a result of which the upper end part 3 is actively raised relative to the lower end part 4.

The available force, for example 200 N, may be defined by the dimension of the hydraulic pump 35 with the following parameters: pressure (bar) and conveyed quantity (cm$^3$/rev). The dynamics or control force respectively of the adjustment is mainly dependent on the hydraulic fluid volume introduced into the actuator fluid element 31 via the fluid-conveying device 33, which volume is conveyed from the tension-stage chamber 49 into the pressure-stage chamber 48, or vice versa.

The type and intensity of the control is taken as a basis in a control algorithm of a correspondingly designed open-loop and/or closed-loop control device (not explicitly shown here).

By means of the open-loop and/or closed-loop control device, the damping and height-adjusting unit 90 may be accordingly adjusted depending on a load acting on the upper end part 3.

For this purpose, the open-loop and/or closed loop control device on the one hand comprises an acceleration-measuring sensor 96 which is arranged on the face 95 of the lower end part 4 and is intended for detecting accelerations acting on the lower end part 4 and on the other hand comprises a position-measuring sensor 97 for detecting the current distance 32 and/or a corresponding distance variation between the upper and the lower end part 3, 4 (see FIG. 1).

It will be understood that the embodiments described above are only first configurations of the invention. The configuration of the invention is therefore not limited to these embodiments.

At this point, reference is explicitly therefore once again made to the fact that the above-described vehicle seat substructure 1 may alternatively also be used as a vehicle cab substructure, provided that it is dimensioned accordingly.

All of the features disclosed in the application documents are claimed as being essential to the invention provided that they are novel over the prior art either individually or in combination.

LIST OF REFERENCE NUMERALS

1 vehicle seat substructure
2 suspension device 3 upper end part
4 lower end part
5 scissors type frame
6 first pair of scissor arms
7 second pair of scissor arms
8 first scissor arm of the first pair of scissor arms
9 first scissor arm of the second pair of scissor arms
10 second scissor arm of the first pair of scissor arms
11 second scissor arm of the second pair of scissor arms
12 common lower fixed-bearing device
13 common upper movable-bearing device
14 common upper fixed-bearing device
15 common lower movable-bearing device
16 pivotal points
19 suspension element
21 vertical direction of the vehicle
25 damping device
26 hydraulic shock absorber element
27 cylinder part
28 cross bar
29 piston part
30 pressure stage
30A tension stage
31 actuator fluid element
32 distance
33 fluid-conveying device
34 flow-control valve element
35 hydraulic pump
36 electric motor
37 proportional flow control valve
38 fluid pipeline system
39 first fluid-conveying system
39 first flow diagram
40 further fluid-conveying system
40A further flow diagram
41 hydraulic-fluid tank
42 external housing
43 working cylinder
44 piston head
45 piston rod
46 hydraulic fluid
47 gas-volume compensation space
48 pressure-stage chamber
49 tension-stage chamber
50 rising pipe
51 pressure-compensation valve
52 foot valve
53 pressure-stage/tension-stage valve
54 lower connecting point
55 upper connecting point
56 tension-stage chamber connection
57 first fluid pipeline
58 first connection
59 first conveying direction
59A second conveying direction
60 further connection
61 further fluid pipeline
62 pressure-stage chamber connection
63 connecting line
64 overflow fluid line
65 feed line
66 non-return valve
67 further feed line
68 further non-return valve
70 graph
71 abscissa
72 height level
73 ordinate
74 central spring characteristic curve
75 upper force characteristic curve
76 point of intersection
77 line produced
78 further line produced
79 lower force characteristic curve
90 damping and height-adjusting unit
95 face
96 acceleration-measuring sensor
97 travel-measuring sensor

What is claimed is:

1. A vehicle seat or vehicle cab, comprising: a suspension device including an upper end part and a lower end part that is deflectable relative to the upper end part, which parts are resiliently interconnected by means of a suspension element, and comprising a damping device for damping vibrations acting on at least one of the two end parts, wherein the damping device and a distance-adjusting device for adjusting a distance between the upper end part and the lower end part comprise a common actuator fluid element controlled by pressure stages and tension stages, the actuator fluid element being operatively connected to a controllable fluid-conveying device, which is in fluid connection with both the pressure-stage chamber and the tension-stage chamber of the actuator fluid element such that the fluid can be conveyed out of either the pressure-stage chamber of the actuator fluid element into the tension-stage chamber or out of the tension-stage chamber of the actuator fluid element into the pressure-stage chamber depending on the conveying direction of the fluid-conveying device.

2. The vehicle seat or vehicle cab according to claim 1, wherein the controllable fluid-conveying device is in fluid connection with both the pressure-stage chamber and the tension-stage chamber of the actuator fluid element such that various height adjustments of the upper end part can be carried out by controlling the power of the controllable fluid-conveying device.

3. The vehicle seat or vehicle cab according to claim 1, wherein the controllable fluid-conveying device is in fluid connection with both the pressure-stage chamber and the tension-stage chamber of the actuator fluid element such that the fluid can be conveyed out of another fluid reservoir of a fluid-conveying system into either the pressure-stage chamber or the tension-stage chamber depending on the conveying direction of the fluid-conveying device.

4. The vehicle seat or vehicle cab according to claim 1, wherein the actuator fluid element is operatively connected to a flow-control valve element, which is in fluid connection with the actuator fluid element and a controllable fluid-conveying device such that the power of the pressure stage or the tension stage can be additionally modulated by means of this flow-control valve element.

5. The vehicle seat or vehicle cab according to claim 4, wherein the flow-control valve element is in fluid connection with the actuator fluid element and the controllable fluid-conveying device such that the power of the pressure stage and the tension stage can be additionally modulated by means of this flow-control valve element while not affecting the power of the fluid-conveying device.

6. The vehicle seat or vehicle cab according to claim 4, wherein the flow-control valve element is in fluid connection with the actuator fluid element and the controllable fluid-conveying device such that vibrations of one of the end parts can be isolated by means of the flow-control valve element.

7. The vehicle seat or vehicle cab according to claim 2, wherein a low-pressure connection of the controllable fluid-conveying device is in fluid connection with the tension-stage chamber by means of a low-pressure line and a high-pressure connection of the controllable fluid-conveying device is in fluid connection with the pressure-stage chamber by means of a high-pressure line, or vice versa in the reverse conveying direction, the low-pressure line and the high-pressure line being fluidically interconnected by means of an electrically operable proportional flow control valve.

8. The vehicle seat or vehicle cab according to claim 1, characterised by an open-loop and/or closed-loop control device for adjusting a controllable fluid-conveying device and/or a flow-control valve element depending on a load acting on the upper end part.

9. The vehicle seat or vehicle cab according to claim 8, wherein the open-loop and/or closed-loop control device comprises an acceleration-measuring sensor which is arranged on the face of the lower end part and is intended for detecting accelerations acting on the lower end part.

10. The vehicle seat or vehicle cab according to either claim 8, wherein the open-loop and/or closed-loop control device comprises a travel-measuring sensor for detecting a distance and/or a distance variation between the upper and the lower end part.

11. A utility motor vehicle comprising a vehicle seat and a vehicle cab, characterised by a vehicle seat and/or a vehicle cab according to claim 1.

* * * * *